United States Patent
Hofmann

(10) Patent No.: US 8,011,712 B2
(45) Date of Patent: Sep. 6, 2011

(54) COVERING CONFIGURATION

(75) Inventor: Peter Hofmann, Neuhausen (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 309 days.

(21) Appl. No.: 12/185,946

(22) Filed: Aug. 5, 2008

(65) Prior Publication Data

US 2009/0051189 A1  Feb. 26, 2009

(30) Foreign Application Priority Data

Aug. 23, 2007 (DE) .......................... 10 2007 039 859

(51) Int. Cl.
*B60R 7/04* (2006.01)

(52) U.S. Cl. ................................... 296/37.16

(58) Field of Classification Search ............... 296/37.16, 296/37.8, 24.3, 24.4, 24.43, 98; 160/238, 160/24, 370.22, 315, 290.1, DIG. 2, DIG. 10; 280/748, 749

See application file for complete search history.

(56) References Cited

U.S. PATENT DOCUMENTS

| | | | | | |
|---|---|---|---|---|---|
| 225,021 | A | * | 3/1880 | Phelan | 160/28 |
| 689,339 | A | * | 12/1901 | Wilson | 160/326 |
| 4,668,001 | A | * | 5/1987 | Okumura et al. | 296/37.16 |
| 5,538,306 | A | * | 7/1996 | Ament | 296/37.1 |
| 5,881,793 | A | * | 3/1999 | Righter et al. | 160/323.1 |
| 6,039,105 | A | * | 3/2000 | Patmore et al. | 160/24 |
| 6,125,908 | A | * | 10/2000 | Ament et al. | 160/323.1 |
| 6,349,986 | B1 | * | 2/2002 | Seel et al. | 296/37.16 |
| 6,416,103 | B1 | * | 7/2002 | Laudenbach et al. | 296/37.1 |
| 6,517,136 | B2 | | 2/2003 | De Ceuster | |
| 7,004,530 | B2 | * | 2/2006 | Marx et al. | 296/100.12 |
| 7,014,239 | B2 | * | 3/2006 | Ehrenberger | 296/37.1 |
| 7,703,803 | B2 | * | 4/2010 | Ekberg et al. | 280/749 |
| 2005/0023854 | A1 | | 2/2005 | Woerner et al. | |
| 2008/0197662 | A1 | * | 8/2008 | Ehrenberger | 296/98 |

FOREIGN PATENT DOCUMENTS

| | | |
|---|---|---|
| DE | 36 05 435 A1 | 8/1987 |
| DE | 39 22 450 C2 | 1/1991 |
| EP | 0234497 A1 | 9/1987 |
| EP | 1243475 A2 | 9/2002 |
| WO | WO 2006093461 A1 * | 9/2006 |

OTHER PUBLICATIONS

European Search Report dated Nov. 26, 2008.
German Patent and Trademark Office Search Report, dated May 16, 2008.

* cited by examiner

*Primary Examiner* — H Gutman

(57) ABSTRACT

A covering configuration has a loading space covering and is arranged behind a vehicle seat in a motor vehicle. The loading space covering extends in a transverse direction of the vehicle and is held at its longitudinal ends in corresponding receptacles on the vehicle. It is important that the receptacle on the driver side is configured such that the one longitudinal end of the loading space covering can be inserted horizontally while a receptacle on the passenger side is configured in such a manner that the other longitudinal end of the loading space covering can be pivoted counter to the direction of travel of the motor vehicle into the receptacle and can be latched therein, or vice versa. In this case, the receptacles on the driver and passenger sides are configured and arranged such that installation of the loading space covering is possible from a passenger compartment.

20 Claims, 3 Drawing Sheets

COVERING CONFIGURATION

CROSS-REFERENCE TO RELATED APPLICATION

This application claims the priority, under 35 U.S.C. §119, of German application DE 10 2007 039 859.1, filed Aug. 23, 2007; the prior application is herewith incorporated by reference in its entirety.

BACKGROUND OF THE INVENTION

Field of the Invention

The present invention relates to a covering configuration with a loading space covering, which is disposed behind a vehicle seat, in a motor vehicle. The load space covering extends in a transverse direction of the vehicle and is held on its longitudinal ends in corresponding receptacles. The invention also relates to a motor vehicle equipped with a covering configuration of this type.

German patent DE 39 22 450 C2 discloses a covering configuration which is of the type in question and in which a roller-blind-type covering which extends in the transverse direction of the vehicle is introduced in a generally vertical direction by its longitudinal ends into corresponding recesses on the vehicle and is latched in place there. In this case, the roller-blind-type covering engages in a form-fitting manner in the recesses on the vehicle and has prestressed pins which secure the roller-blind-type covering in the associated recesses. To release the spring-prestressed pins, an actuating element is provided, which is easily accessible from the outside and has an actuating path lying at right angles to the displacement path of the associated pin.

In particular in the case of motor vehicles in the manner of coupes, there is a tunnel-like region which is located behind the rear seats and in which a loading space covering can only be inserted with difficulty because of the weight of the same, since a person usually stands behind the vehicle at a distance from the receptacles for the loading space covering. However, if the loading space covering has moved a long distance to the rear in order, for example, to be able to ensure easier installation, the loading space covering gets in the way of easy loading of the trunk space. In addition, additional extensive coverings are required for the region between the seat backs and the loading space covering, which coverings, in the event of being taken out, have to be removed separately.

SUMMARY OF THE INVENTION

It is accordingly an object of the invention to provide a covering configuration that overcomes the above-mentioned disadvantages of the prior art devices of this general type, which is distinguished in particular by easier installation and removal of a loading space covering.

The invention is based on the general concept of providing a loading space covering which is held at its longitudinal ends in receptacles on the vehicle. The receptacles are disposed directly behind a vehicle seat and are configured in such a manner that installation or removal of the loading space covering is possible from a passenger compartment by the loading space covering being horizontally insertable at one longitudinal end into a receptacle on the driver side or passenger side while it can be pivoted at its other longitudinal end counter to the direction of travel of the motor vehicle into the opposite receptacle and can be latched in place therein. The possibility of installing the loading space covering according to the invention from the passenger compartment enables the disadvantages known from the prior art, such as, in particular, restriction of a loading cross section at the rear and a difficult installation or removal operation from the loading space of the motor vehicle to be avoided, as a result of which, first, the loading operation is facilitated and, second the convenience for the driver of the motor vehicle, in particular for the fitting or removal of the loading space covering, can be increased. Whether the receptacle on the driver side or passenger side is configured as a plug-in receptacle and the opposite receptacle is configured for the loading space covering to be pivoted into can be determined individually, for example depending on the type of vehicle.

An electric contact device is expediently provided in the region of the receptacle on the driver side or the passenger side, via which contact device a loading space covering, which has an electric drive, is connected, in the fitted state, to an electric system of the motor vehicle. In particular in the case of higher value motor vehicles, a loading space covering can be provided with an electric drive for rolling up or extending a luggage-compartment roller blind, the drive, for the purpose of actuation, has to be connected to the electric system of the motor vehicle. The contact device according to the invention permits an electric contact connection in a simple manner between the electric drive of the loading space covering, on the one hand, and the electric system of the motor vehicle, on the other hand, such that a loading space covering with an electric drive of this type can also be fitted or removed in a similarly simple manner as a loading space covering without an electric drive.

In a further advantageous embodiment of the solution according to the invention, the loading space covering is arranged directly behind the vehicle seat or has at least one gap covering which, in particular in the case of vehicle seats with adjustable backrests, covers a gap between the backrest and the loading space covering. If the loading space covering according to the invention is disposed directly behind the vehicle seats, a gap covering can usually be dispensed with while, in the case of motor vehicle seats, in particular in the case of rear seats, with adjustable backrests, depending on the position of the same a gap remains between the backrest and the loading space covering, which gap can then be covered by the gap covering according to the invention, which is preferably prestressed in the direction of the backrest, such that a closed appearance can be produced. At the same time, the gap covering makes it possible for goods stowed below the loading space covering to be protected from view and also makes it possible for the same to be protected from soiling.

It goes without saying that the features mentioned above and those which have yet to be explained below can be used not only in the respectively stated combination but also in different combinations or on their own without departing from the scope of the present invention.

Other features which are considered as characteristic for the invention are set forth in the appended claims.

Although the invention is illustrated and described herein as embodied in a covering configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
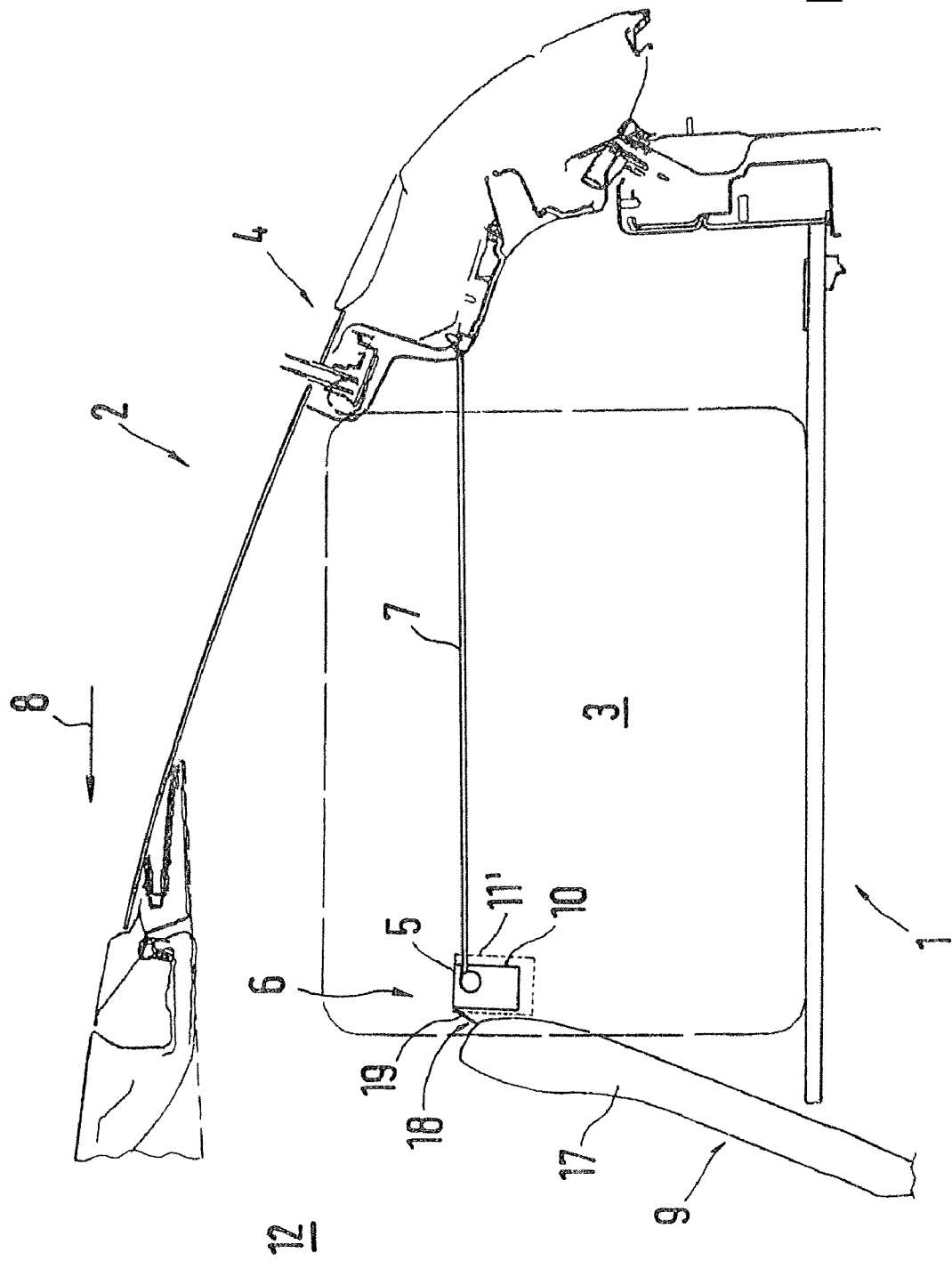
FIG. 1 is a diagrammatic, longitudinal section view though a rear region of a motor vehicle with a covering configuration according to the invention.

Referring now to the figures of the drawing in detail and first, particularly, to FIG. 1 thereof, there is shown a rear region 1 of a motor vehicle, in particular of a sports car 2 in the manner of a coupe, that has a loading space 3 which is usually accessible via a tailgate 4. In order to be able to prevent goods which are stored or stowed directly below the tailgate 4 from being seen, a loading space covering 5 which is part of a covering configuration 6 is provided. The loading space covering 5 has a box-like housing in which a roller-blind-type covering 7 is wound up, preferably with spring prestressing, with it being possible for the roller-blind-type covering 7 to be pulled out of the housing of the loading space covering 5 counter to the direction of travel 8 and to be fastened at its end which is in front in the pulling-out direction to the tailgate 4 or to another connecting point on the motor vehicle, in order to provide protection from prying eyes. In addition to the loading space covering 5 which is oriented approximately horizontally in the operating position, the covering configuration 6 can additionally also contain a roller-blind-type sunshade or protection from prying eyes (not illustrated specifically in the figures) which extends approximately in the vertical direction. The roller-blind-type sunshade or protection from prying eyes can be accommodated either in the housing of the loading space covering or in a separate housing.

Figure 2:
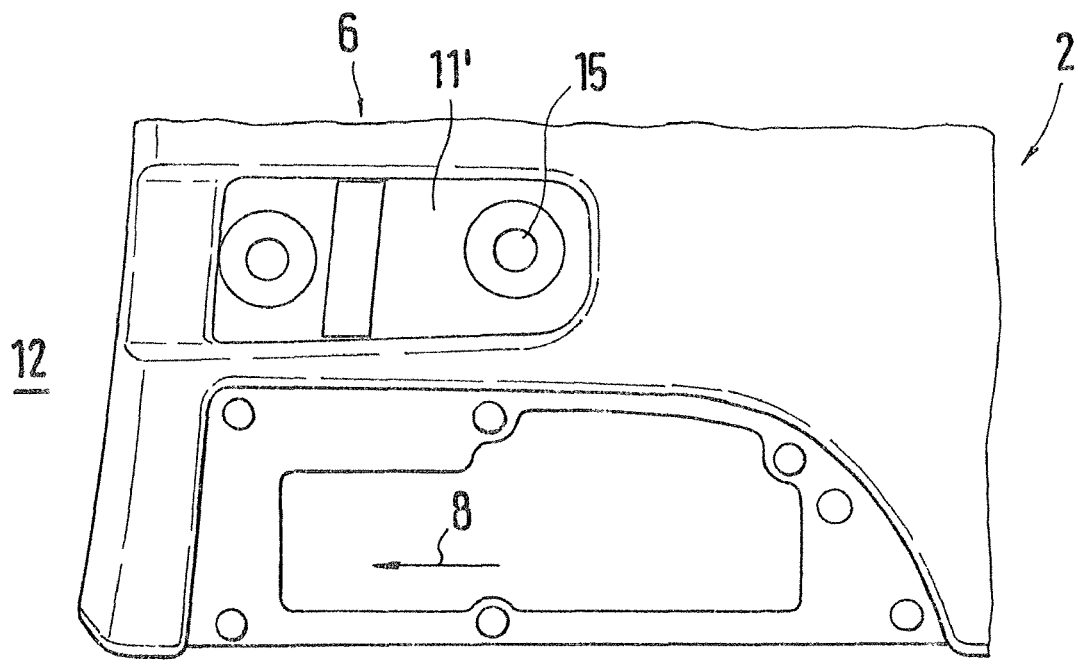
FIG. 2 is an illustration of a receptacle on a passenger side for a loading space covering according to the invention.
Figure 3:
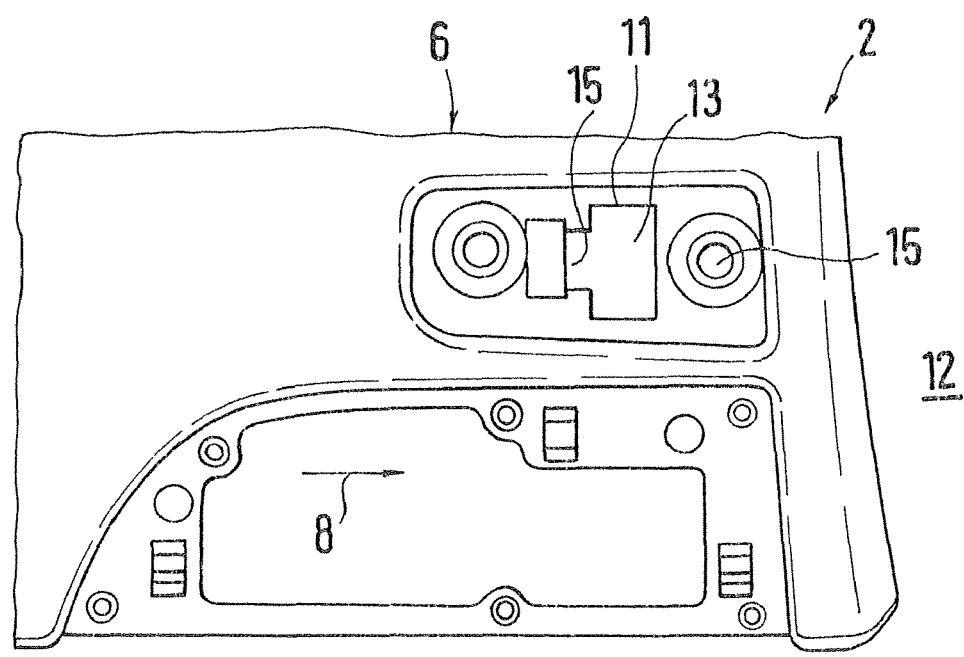
FIG. 3 is an illustration of a receptacle on a driver side for the loading space covering.
Figure 4:
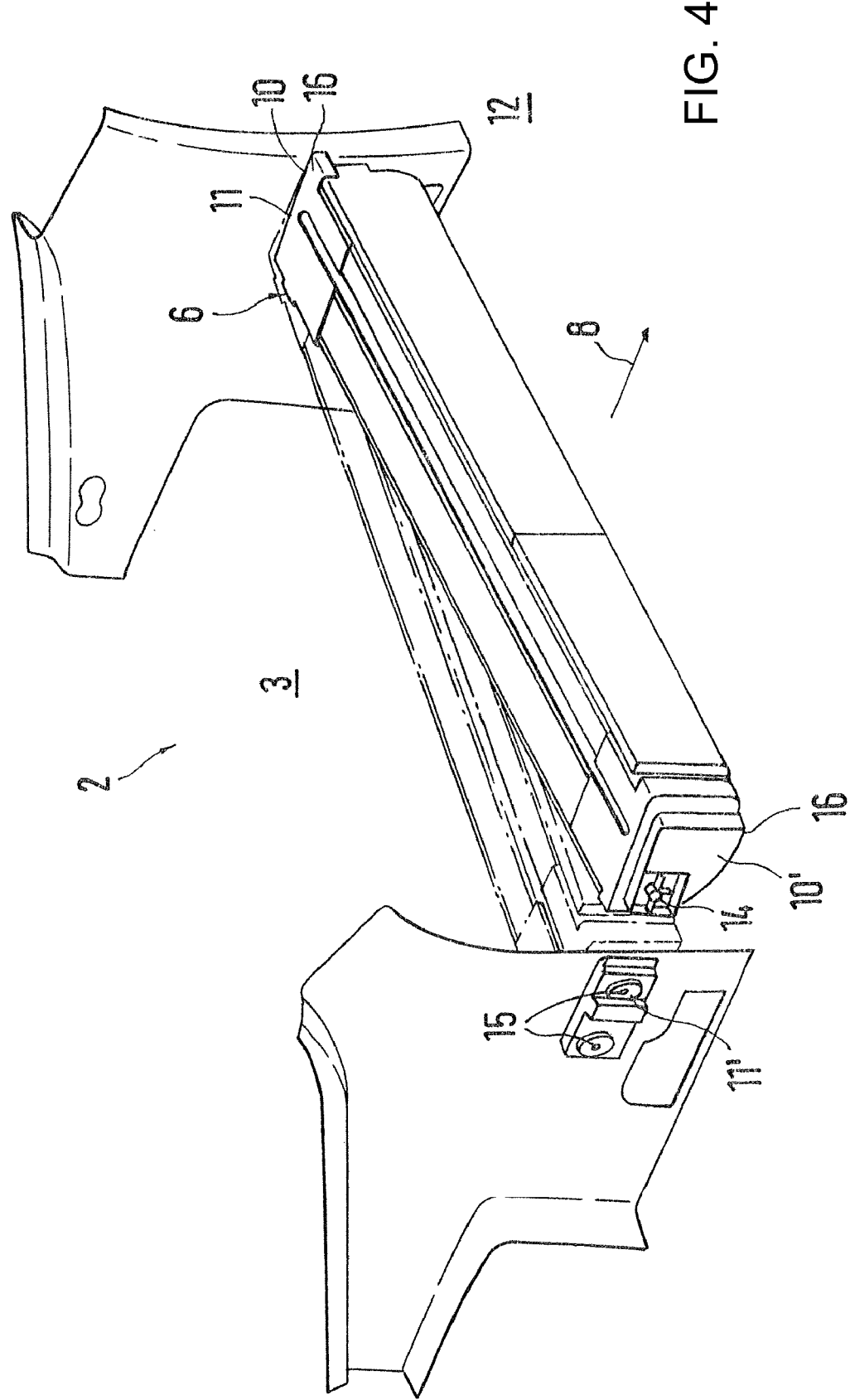
FIG. 4 is a diagrammatic, perspective view of a loading space covering when fitted into the receptacles on the vehicle.

As can be gathered from FIG. 1, the loading space covering 5 is disposed directly behind a vehicle seat 9 which can be configured in particular as a rear seat. In this case, the loading space covering 5 has an elongate configuration and extends generally in the transverse direction of the vehicle. The loading space covering 5 is held at its longitudinal ends 10, 10' (see FIG. 4) in receptacles 11 and 11' on the vehicle. Examples of such receptacles 11 and 11' on the vehicle are illustrated in detail in FIGS. 2 and 3. According to the invention, the receptacle 11 on the driver side (see FIG. 2) is now configured in such a manner that the one longitudinal end 10 of the loading space covering 5 can be inserted horizontally while the receptacle 11' on the passenger side (see FIG. 3) is configured in such a manner that the other longitudinal end 10' of the loading space covering 5 can be pivoted counter to the direction of travel 8 of the vehicle 2 into the receptacle 11' and can be latched in place therein. Of course, it is also conceivable for the receptacle 11 according to FIG. 3 to be arranged on the passenger side and for the receptacle 11' according to FIG. 2 to be arranged on the driver side.

As an alternative, the two receptacles 11 and 11' may also be open to the front and permit simple pushing in of the loading space covering 5 counter to the direction of travel—in a manner similar to a drawer.

The configuration of the loading space covering 5 directly behind the vehicle seats 9 enables installation or removal of the loading space covering 5 from a passenger compartment 12.

The receptacles 11, 11' on the vehicle can be disposed on an inner lining of the motor vehicle 2, and in particular in the region of a C pillar of the motor vehicle 2. Furthermore, the receptacles 11, 11' on the vehicle are preferably configured as recessed receptacles 11, 11', for example receptacles which are recessed into the inner lining.

Furthermore, the loading space covering 5 can be equipped with an electric drive which at least assists a rolling-up or rolling operation of the roller-blind-type covering 7. For this purpose, an electric contact connection between the electric drive of the loading space covering 5 and an electric system of the motor vehicle is required. In this case, it is conceivable for the receptacles 11, 11' on the driver side and on the passenger side to be provided with an electric contact device 13 via which the loading space covering 5, which has an electric drive, is connected, in the fitted state, to the electric system of the motor vehicle 2. By the contact device 13, an installation or removal operation of the loading space covering 5 with an electric drive is therefore similarly simple as in the case of a loading space covering 5 without an electric drive.

To securely hold the loading space covering 5 in the receptacles 11 and 11', latching elements 14 which can be latched in place in the receptacles 11 and 11' by corresponding mating latching elements or latching openings 15 can be provided at the respective longitudinal end 10, 10' of the loading space covering 5. The latching elements 14 can be configured, for example, as spring-loaded latching lugs which are prestressed away from the loading space covering 5 in the longitudinal direction thereof and, in the prestressed position, engage in the latching openings 15 on the vehicle. It is also conceivable in this case for at least one further spring device to be provided, via which at least one longitudinal end cap 16 of the loading space covering 5 is prestressed away from the loading space covering 5 in the longitudinal direction thereof, with the securing of the loading space covering 5 in the respective receptacle 11, 11' then taking place via the spring-loaded longitudinal end cap 16.

Fitting or removal of the loading space covering 5 takes place here as now described.

The backrests 17 of the vehicle seats 9 have to be or should be folded over forward in the direction of travel 8 in advance in order to obtain unhindered access to the loading space covering 5. In this case, it is conceivable that the person occupied with the installation or removal of the loading space covering 5 can sit on a rear side of the folded-over backrest 17, as a result of which the person comes into the vicinity of the center of gravity of the loading space covering 5, and therefore the latter, even if equipped with an electric drive, can be removed from the lateral receptacles 11, 11' or inserted therein in a very specific manner and without a great deal of effort. The loading space covering 5 is then inserted by its one longitudinal end 10 essentially horizontally into the receptacle 11 on the driver side from the passenger compartment 12 in order subsequently to be able to be pivoted counter to the direction of travel 8 by its second longitudinal end 10' into the receptacle 11' on the passenger side. After reaching its fitted position, the loading space covering 5 is held securely in the respective receptacles 11, 11' via latching elements 14. An operation to remove the loading space covering 5 takes place in the reverse manner, with first of all the latching elements 14 being unlocked and then the loading space covering 5 being pivoted by its longitudinal end 10' out of the receptacle 11' in the direction of travel 8 of the motor vehicle 2 in order subsequently to be pulled at its other longitudinal end 10 out of the receptacle 11.

If the vehicle seats 9 are a driver seat or a passenger seat, then its backrest 17 can usually be adjusted, which leads to a gap 18 of greater or lesser width between the backrest 17 and the loading space covering 5. In order to be able to reliably cover such a gap 18, it is conceivable for the loading space covering 5 to have a gap covering 19, for example a flap, which flexibly covers the gap 18 arising between the backrest 17 and loading space covering 5. In this case, the gap covering 19 can be prestressed in the direction of the backrest 17 by a spring device. Of course, it is also conceivable for such a gap covering 19 to be dispensed with if the vehicle seats 9 involve seats with a non-adjustable backrest 17 and the loading space covering 5 is arranged directly behind the backrests 17 of the vehicle seats 9.

In general, the receptacles 11 and 11' are configured in such a manner that the longitudinal end 10 which is positioned first during the installation of the loading space covering 5 can simply be inserted into the receptacle 11. The longitudinal end 10' which is fitted thereafter is pushed into the receptacle 11', which is configured in a manner similar to a drawer, from the front, i.e. counter to the direction of travel 8. If the loading space covering 5 is equipped with an electrically driven roller-blind-type covering 7, then, when the loading space covering 5 is fitted, an automatic connection of the electric drive of the loading space covering 5 to the electric system of the motor vehicle 2 takes place via the electric contact connection 13. In this case, the contact connection 13 is preferably provided in the receptacle 11, with it also being conceivable for such an electric contact connection 13 to be provided in both receptacles 11 and 11'.

The type of receptacle selected, i.e. the installation according to the invention counter to the direction of travel 8, permits maximum design freedom with regard to a lining of a pillar. The tolerances between the receptacles 11 and 11' and the longitudinal ends 10, 10' of the loading space covering 5 are preferably absorbed by resilient longitudinal end caps 16, thus producing a uniform join profile.

The invention claimed is:

1. A covering configuration, comprising:
   receptacles to be disposed on a motor vehicle;
   a loading space covering housing to be disposed behind a vehicle seat of the motor vehicle, said loading space covering housing having longitudinal ends and extending in a transverse direction of the motor vehicle and being held at said longitudinal ends in said receptacles, said loading space covering housing having a covering stored in and released from said loading space covering housing for covering an area of the motor vehicle;
   said receptacles including a driver side receptacle configured such that a first of said longitudinal ends of said loading space covering housing can be inserted horizontally and a passenger side receptacle configured such that a second of said longitudinal ends of said loading space covering housing can be pivoted counter to a direction of travel of the motor vehicle into said passenger side receptacle and can be latched therein, or vice versa, said driver side receptacle and said passenger side receptacle being configured and disposed such that installation of said loading space covering housing is possible from a passenger compartment of the motor vehicle.

2. The covering configuration according to claim 1, wherein said receptacles on the motor vehicle are disposed on an inner lining of the motor vehicle.

3. The covering configuration according to claim 1, wherein said receptacles on the motor vehicle are disposed in a region of a C pillar of the motor vehicle.

4. The covering configuration according claim 1,
   wherein said loading space covering housing has an electric drive; and
   further comprising an electric contact device disposed in a region of one of said first receptacle and said second receptacle, via said electric contact device said loading space covering housing, which has said electric drive, is connected, in a fitted state, to an electric system of the motor vehicle.

5. The covering configuration according to claim 1,
   wherein said receptacles have latching units selected from the group consisting of mating latching elements and latching openings formed therein; and
   further comprising further latching elements disposed on at least one of said longitudinal ends of said loading space covering housing, said further latching elements interacting with said latching units.

6. The covering configuration according to claim 5,
   wherein said loading space covering housing has longitudinal end caps;
   further comprising at least one spring device, via said spring device at least one of said longitudinal end caps or at least one of said further latching elements is prestressed away from said loading space covering housing in a longitudinal direction thereof.

7. The covering configuration according to claim 1, wherein said loading space covering housing is disposed directly behind the vehicle seat.

8. The covering configuration according to claim 1, wherein said loading space covering housing has a gap covering which, in a case of vehicle seats with adjustable backrests, covers a gap between the adjustable backrests and said loading space covering housing.

9. The covering configuration according to claim 8, wherein said gap covering is prestressed in a direction of the adjustable backrest.

10. The covering configuration according to claim 1, wherein said loading space covering housing is disposed behind a rear seat of the motor vehicle.

11. A motor vehicle, comprising:
    a covering configuration, containing:
    receptacles;
    a vehicle seat;
    a loading space covering housing disposed behind said vehicle seat, said loading space covering housing having longitudinal ends and extending in a transverse direction of the motor vehicle and being held at said longitudinal ends in said receptacles, said loading space covering housing having a covering stored in and released from said loading space covering housing for covering an area of the motor vehicle; and
    said receptacles including a driver side receptacle configured such that a first of said longitudinal ends of said loading space covering housing can be inserted horizontally and a passenger side receptacle configured such that a second of said longitudinal ends of said loading space covering housing can be pivoted counter to the direction of travel of the motor vehicle into said passenger side receptacle and can be latched therein, or vice versa, said driver side receptacle and said passenger side receptacle are configured and disposed such that installation of said loading space covering housing is possible from a passenger compartment.

12. The covering configuration according to claim 11, further comprising an inner lining and said receptacles are disposed on said inner lining.

13. The covering configuration according to claim 11, further comprising a C pillar and said receptacles are disposed in a region of said C pillar.

14. The covering configuration according claim 11, wherein said loading space covering housing has an electric drive;
further comprising an electric system; and
further comprising an electric contact device disposed in a region of one of said first receptacle and said second receptacle, via said electric contact device said loading space covering housing, which has said electric drive, is connected, in a fitted state, to said electric system.

15. The covering configuration according to claim 11, wherein said receptacles have latching units selected from the group consisting of mating latching elements and latching openings formed therein; and
further comprising further latching elements disposed on at least one of said longitudinal ends of said loading space covering housing, said further latching elements interacting with said latching units.

16. The covering configuration according to claim 15,
wherein said loading space covering housing has longitudinal end caps;
further comprising at least one spring device, via said spring device said at least one said longitudinal end caps or at least one of said further latching elements is prestressed away from said loading space covering housing in a longitudinal direction thereof.

17. The covering configuration according to claim 11, wherein said loading space covering housing is disposed directly behind said vehicle seat.

18. The covering configuration according to claim 11, wherein:
said vehicle seat has an adjustable backrest; and
said loading space covering housing has a gap covering a gap between said adjustable backrest and said loading space covering housing.

19. The covering configuration according to claim 18, wherein said gap covering is prestressed in a direction of said adjustable backrest.

20. The covering configuration according to claim 11, wherein said vehicle seat is a rear seat and said loading space covering housing is disposed behind said rear seat.

\* \* \* \* \*